United States Patent [19]
Aoki et al.

[11] Patent Number: 5,983,950
[45] Date of Patent: Nov. 16, 1999

[54] HOSE STRUCTURE AND METHOD OF MANUFACTURING THE SAME

[75] Inventors: Tomohide Aoki, Gifu-ken; Masayuki Nakagawa, Iwakura; Yukiharu Takeuchi, Inazawa; Katsumi Tanaka, Bisai, all of Japan

[73] Assignee: Toyoda Gosei Co., Ltd., Aichi-ken, Japan

[21] Appl. No.: 08/805,203

[22] Filed: Feb. 27, 1997

[30] Foreign Application Priority Data

Feb. 29, 1996 [JP] Japan ................................ 8-071227(P)

[51] Int. Cl.⁶ ........................................................ F16L 11/11
[52] U.S. Cl. .......................... 138/109; 138/114; 138/121; 138/148
[58] Field of Search .................................... 138/109, 111, 138/114, DIG. 3, DIG. 7, 121, 122, 137, 148

[56] References Cited

U.S. PATENT DOCUMENTS

| | | |
|---|---|---|
| 992,581 | 5/1911 | Noonan et al. |
| 2,204,294 | 6/1940 | Blanchard . |
| 2,444,988 | 7/1948 | Guarnaschelli . |
| 3,240,234 | 3/1966 | Bond, Jr. et al. |
| 3,299,417 | 1/1967 | Sibthorpe . |
| 3,725,565 | 4/1973 | Schmidt . |
| 3,837,364 | 9/1974 | Jenner . |
| 4,086,665 | 5/1978 | Poirier . |
| 4,599,784 | 7/1986 | Canu, Jr. et al. |
| 4,718,568 | 1/1988 | Dal Palu . |
| 5,037,143 | 8/1991 | Sanders et al. |
| 5,469,892 | 11/1995 | Noone et al. ...................... 138/DIG. 7 |
| 5,472,746 | 12/1995 | Miyajima et al. ...................... 138/109 |
| 5,600,752 | 2/1997 | Lopatinsky ................................ 138/114 |
| 5,664,608 | 9/1997 | Kawasaki ................................ 138/109 |
| 5,829,483 | 11/1998 | Tukahara et al. ...................... 138/109 |

FOREIGN PATENT DOCUMENTS

| | | |
|---|---|---|
| 2568849 | 2/1986 | France . |
| 43-25319 | 8/1968 | Japan . |
| 43-25320 | 8/1968 | Japan . |
| 50-80621 | 7/1975 | Japan . |
| 54-5933 | 3/1979 | Japan . |
| 58-42484 | 3/1983 | Japan . |
| 1-31839 | 9/1989 | Japan . |
| 3-172696 | 7/1991 | Japan . |
| 3-114427 | 11/1991 | Japan . |

*Primary Examiner*—James F. Hook
*Attorney, Agent, or Firm*—Pillsbury Madison & Sutro LLP

[57] ABSTRACT

A hose 10 of the invention includes an outer hose member 12 composed of a rubber and an inner hose member 14 composed of a resin. A pair of projection ring elements 26 formed on opposite ends of the inner hose member 14 are received in a pair of inner circumferential grooves 24 formed in thick-walled tube elements 18 of the outer hose member 12. The projection ring elements extend the inner circumferential grooves 24 with such dilatation and deformation of the concavity of the inner circumferential grooves 24 enabling the thick-walled tube elements 18 to generate forces acting along the concavity of the inner circumferential grooves 24. Such forces are applied as pressing forces against the projection ring elements 26. The thick wall of the thick-walled tube elements 18 enables the pressing forces to be maintained while the projection ring elements 26 are retained in the inner circumferential grooves 24.

13 Claims, 8 Drawing Sheets

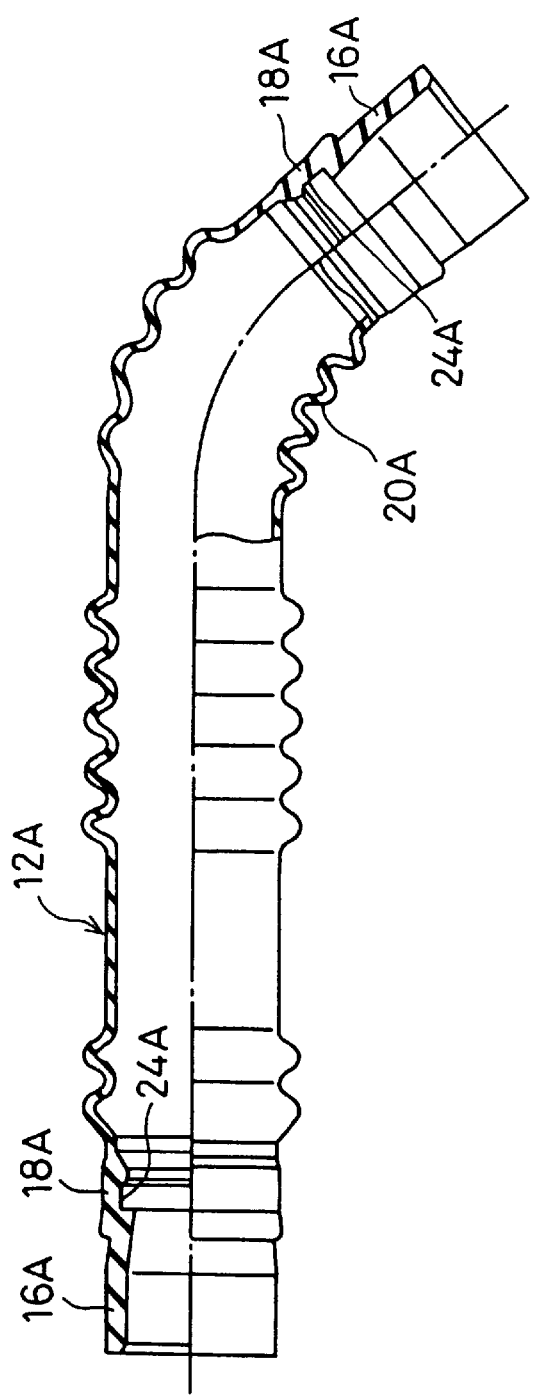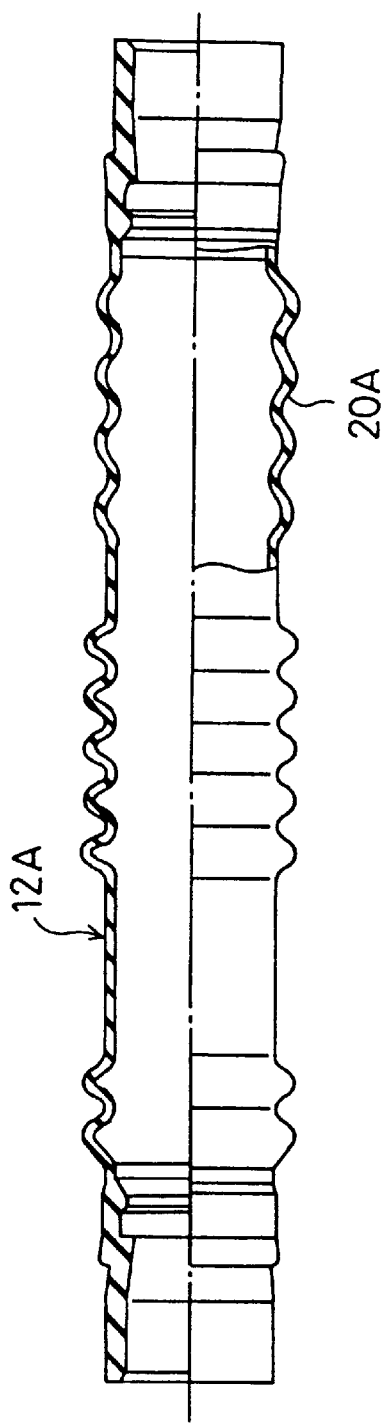
Fig. 8(a)
Fig. 8(b)

HOSE STRUCTURE AND METHOD OF MANUFACTURING THE SAME

BACKGROUND OF THE INVENTION

1. Field of the Invention

The present invention relates to a hose, connected to an external member, that provides a fluid flow path and defines an inner-hose flow path connecting with the flow path of the external member, and also to a method of manufacturing such a hose. More specifically, the present invention relates to a novel approach for interconnecting an outer hose member, composed of a rubber, with an inner hose member composed of a resin, as well as to a method of manufacturing the hose.

2. Description of the Prior Art

Recently, use of hose members having high gasoline vapor barrier properties have recently gone into fuel flow path applications, for example, in a vehicle. FIG. 10 shows a conventional fuel hose structure. An inner hose member 200 is substantially concentrically arranged inside an outer hose member 100 composed of a resin. An external member, such as a pipe 300, is connected to an end of the hose structure with that connection being implemented by interposing a separate sealing member 400 between an end portion 201 of the inner hose member 200 and the external member 300. The outer hose member 100 is then clamped about the inner hose member 200 and the sealing member 400 using a clamping ring element 402. Alternatively, the end portion of the outer hose member 100 may be extended along its axis so that a portion can be turned to lie inside the end portion 201 of the inner hose member 200. In this case, the turned end portion of the outer hose member 100 works in place of the separate sealing member 400.

The conventional hose, however, has several problems as discussed below.

First, however, the conventional hose structure is connected to the external member 300 by interposing the separate sealing member 400 between the inner hose member 200 and the external member 300, or turning part of an extended end portion of the outer hose member 100 inside the inner hose member 200, the process of assembly becomes rather complicated and time-consuming. Next, the outer hose member 100 can be secured directly to the external member 300. In such a case, the end portion 201 of the inner hose member 200 does not reach the end portion of the external member 300. Further, such a structure results in relatively loose fit between the inner hose member 200 and the outer hose member 100. Consequently, there are insufficient sealing properties between the outer hose member 100 and the inner hose member 200, and this condition is, thereby, impractical.

SUMMARY OF THE INVENTION

The object of the present invention is thus to provide an improved hose structure that enables an inner hose member to be securely fixed to an outer hose member yet maintain the high sealing properties between the outer hose member and the inner hose member. Another objective is to simplify the procedure for fixing the hose structure to an external member.

At least part of the above and the other related objectives is realized by a hose that connects with an external member, thus providing a flow path of a fluid, and defines an inner-hose flow path that connects with the flow path of the external member. The hose of the invention includes: an outer hose member composed of a rubber material and comprising a first tube element formed on an end thereof, with an external member being fit into and connected to the first tube element. The inner hose member is composed of a resin and arranged inside the outer hose member to define the inner-hose flow path. The outer hose member includes a second tube element extending from the first tube element and having a wall thickness that will apply and maintain a restoring force when the second tube element is dilated in a diametric direction along the length of the hose. The second tube element has an inner circumferential groove formed as an annular concavity about an inner circumferential face thereof. The inner hose member also includes a projection ring element formed as a circular convexity that will be fitted into and extend the inner circumferential groove.

In the hose of the present invention when constructed and assembled, the inner hose projection ring element is fitted into the inner circumferential groove of the second tube element of the outer hose member thereby extending the inner circumferential groove. This structure defines the arrangement of the inner hose member relative to the outer hose member and securely fixes the inner hose member to the outer hose member. The completed hose, accordingly, has a double-layer structure including the resin inner hose member arranged inside the rubber outer hose member. The external member is fitted into and connected to the first tube element of the outer hose member, so that the inner-hose flow path, defined by the inner hose member, connects with the fluid flow path of the external member.

The concave area of the inner circumferential groove formed in the outer hose member is dilated and deformed by the projection ring element of the inner hose member. Such dilatation and deformation of the rubber material of the outer hose member causes the second tube element of the outer hose member to produce a restoring force. The restoring force is applied as a pressing force onto the projection ring element of the inner hose member. The thick-walled second tube element enables such a pressing force to be maintained while the projection ring element is fitted in the inner circumferential groove. The pressing force also enables the inner hose member to be securely fixed to the outer hose member with high sealing properties through the fitting of the projection ring element into the inner circumferential groove. The hose structure of the present invention allows the external member to be directly fitted into and attached to the first tube element of the outer hose member. Unlike the conventional structure, the hose structure of the present invention does not require interposition of any additional or separate element nor does it require any portion of the end of the outer hose member to be turned back upon itself or be folded over. The hose structure of the present invention thus favorably simplifies the procedure of suitably clamping, sealing, and fixing the hose to the external member.

The hose of the present invention may have structures according to the following embodiments.

In accordance with a first embodiment, the projection ring element has a diametric dimension that is 10 to 20% greater than that of the inner circumferential groove of the second tube element in a non-dilated state and a longitudinal dimension, along the length of the hose, that is 0.5 to 2 mm longer than that of the inner circumferential groove.

Through the simple adjustment of the dimensions, the structure of the first embodiment enables the projection ring element of the inner hose member to be fitted into the inner circumferential groove of the outer hose member while dilating and deforming the concavity of the inner circumferential groove.

In accordance with a second embodiment, the projection ring element is composed of a complex material that is obtained by mixing a reinforcing material with the resin.

The structure of the second embodiment has an advantage in that when the projection ring element of the inner hose member is fitted into the inner circumferential groove of the outer hose member, to extend the inner circumferential groove, the inner hose projection ring element receives a pressing force applied by the second tube element of the outer hose member. In the structure of the second embodiment, the inner hose projection ring element is composed of a complex material having reinforcing fibers, or the like, contained in the resin, and, accordingly, has the required strength to resist the pressing force. Such resistance can be further enhanced by increasing the wall thickness of the inner hose projection ring element in a diametric direction.

In accordance with a third embodiment, the materials of the outer hose member and the inner hose member are appropriately selected. The outer hose member is composed of a rubber material having high fire resistance, abrasive resistance, and oil resistance. Available examples include butadiene rubbers, such as butadiene-acrylonitrile copolymer (NBR), a rubber mixture of butadiene-acrylonitrile copolymer (NBR) and polyvinyl chloride (PVC), ether rubbers, such as epichlorohydrin rubber (CO) and epichlorohydrin-ethylene oxide copolymer (ECO), and fluororubbers, such as vinylidene fluoride-hexafluoropropylene-tetrafluoroethylene terpolymer (FKM).

In the third embodiment, no specific material but a conventional, known material is adopted for the outer hose member.

In accordance with a fourth embodiment, the inner hose member is composed of either a polyamide resin or a fluororesin, which has excellent barrier properties against gasoline fuel and is, accordingly, suitable for a fuel hose, for example, in a vehicle.

In accordance with a fifth embodiment, the inner hose member has a double-layer structure including an inner layer composed of a fluororesin and an outer layer composed of a polyamide resin.

In the fifth embodiment, the inner layer has excellent barrier properties against alcohols, whereas the outer layer has the high resistance against pressing or constricting forces. This structure improves the durability the hose structure used as a fuel hose.

In accordance with a sixth embodiment, the outer hose member further includes a first bellows tube element, and the inner hose member has a second bellows tube element that is in contact with an inner-most diametric portion of the first bellows tube element.

In the sixth embodiment, the outer hose member and the inner hose member are in contact with each other only at the respective rises of the first bellows tube element and the second bellows tube element. This structure lowers the frictional resistance and enables the hose to be curved or bent without any difficulties. This leads to improved hose flexibility as well as in workability, for example, when bending the hose.

In accordance with a seventh embodiment, the outer hose member includes a pair of the first tube elements formed on both ends thereof and a pair of the second tube elements that have an identical shape and respectively extend from the first tube elements. The inner hose member includes a pair of the projection ring elements, that have an identical shape, and are arranged at a pitch corresponding to the pitch of a pair of the inner circumferential grooves formed in the pair of the second tube elements.

In the seventh embodiment, when the inner hose member is inserted into the outer hose member from either end, the protection ring elements can be fitted into the respective inner circumferential grooves. This structure does not specify the direction of insertion of the inner hose member into the outer hose member, and the procedure of assembly is, thus, favorably simplified.

The present invention is also directed to a method of manufacturing a hose with an outer hose member composed of a rubber and an inner hose member composed of a resin and arranged inside the outer hose member. The hose connects with an external member, that provides a flow path for a fluid, and has an inner-hose flow path defined by the inner hose member to connect with the flow path of the external member.

The method includes the steps of:

(a) forming a first tube element on one or opposite ends of the outer tube to securely hold and connect with the external member, and forming a second tube element extending away from the first tube element and having a wall thickness sufficient to apply and maintain a restoring force or forces, when the second tube element is dilated, in a diametric direction about the inner hose, the second tube element comprising an inner circumferential groove formed as a circular concavity in an inner circumferential face thereof;

(b) providing the inner hose member with a projection ring element that is formed as a circular convex and arranged to be fitted or placed into the inner circumferential groove so as to extend about the inner circumferential groove;

(c) expanding the outer hose member in a diametric direction, along the length thereof and then placing the inner hose member inside the outer hose member at a predetermined position to arrange the projection ring element opposite to the inner circumferential groove; and (d) canceling or releasing the expansion of the outer hose member.

In the method of the present invention, the resin inner hose member is placed inside the rubber outer hose member, while the outer hose member is diametrically expanded along the length thereof. This enables the inner hose member to be readily inserted into the outer hose member and arranges the inner hose projection ring element at a specific position to face the inner circumferential groove of the outer hose member. After the projection ring element is fitted into the expanded inner circumferential groove, the expansion of the outer hose member is canceled to restore the inner circumferential groove to its original shape. The cancellation of the expansion also enables the inner hose projection ring element to be fitted in and extend the inner circumferential groove of the outer hose member. The hose that includes the inner hose member securely fixed to the outer hose member with high sealing properties and is clamped and fixed to the external member by a simple procedure is readily manufactured by the method of the present invention.

However, a variety of techniques may be adopted to diametrically expand the outer hose member along its length. By way of example, a cap body, having a blow hole for compressed air, is hermetically attached to one end of the outer hose member while the discharge of the air from the other end is restricted. The difference between the air blown out of the cap and the discharged air causes the outer hose member to expand diametrically along its length. The discharge of the air can be restricted by closing the opening of the outer hose member at the other end by the inner hose member having the air-tight inner-hose flow path.

The method of the present invention may go into a variety of applications, some of which are discussed below.

In accordance with a first application, the step (a) includes the step of providing the outer hose member molded into a curved shape, and the step (b) includes the step of providing the inner hose member that is also molded into a curved shape corresponding to the curved shape of the outer hose member. The step (c) can include the steps of expanding the outer hose member in a diametric direction, along the length thereof, while stretching the curved outer hose member and keeping the outer hose member straight. The inner hose member can then be arranged inside the outer hose member while stretching the curved inner hose member and keeping the inner hose member straight.

The first application enables the hose of a curved shape to be readily manufactured by providing the curved outer hose member and the curved inner hose member and carrying out expansion of the outer hose member, insertion of the inner hose member into the outer hose member, and cancellation of the expansion while the outer hose member and the inner hose member are kept straight.

In accordance with a second application, the method further includes the step of thermally treating the hose comprising the inner hose member arranged inside the outer hose member, so as to thermally deform the hose to have a curved hose conduit.

The second application has the post treatment step of thermally treating and deforming the hose of a straight shape after cancellation of the expansion of the outer hose member. This application also enables the hose of a curved shape to be readily manufactured.

These and other objects, features, aspects, and advantages of the present invention will become more apparent from the following detailed description of the preferred embodiments with the accompanying drawings in which like reference numerals are used for the same parts in various views.

BRIEF DESCRIPTION OF THE DRAWINGS

FIGS. 8(a) and 8(b) show the process of manufacturing an outer hose member 12A;

DESCRIPTION OF THE PREFERRED EMBODIMENTS

Some modes of carrying out the present invention are described as preferred embodiments.

Figure 1:
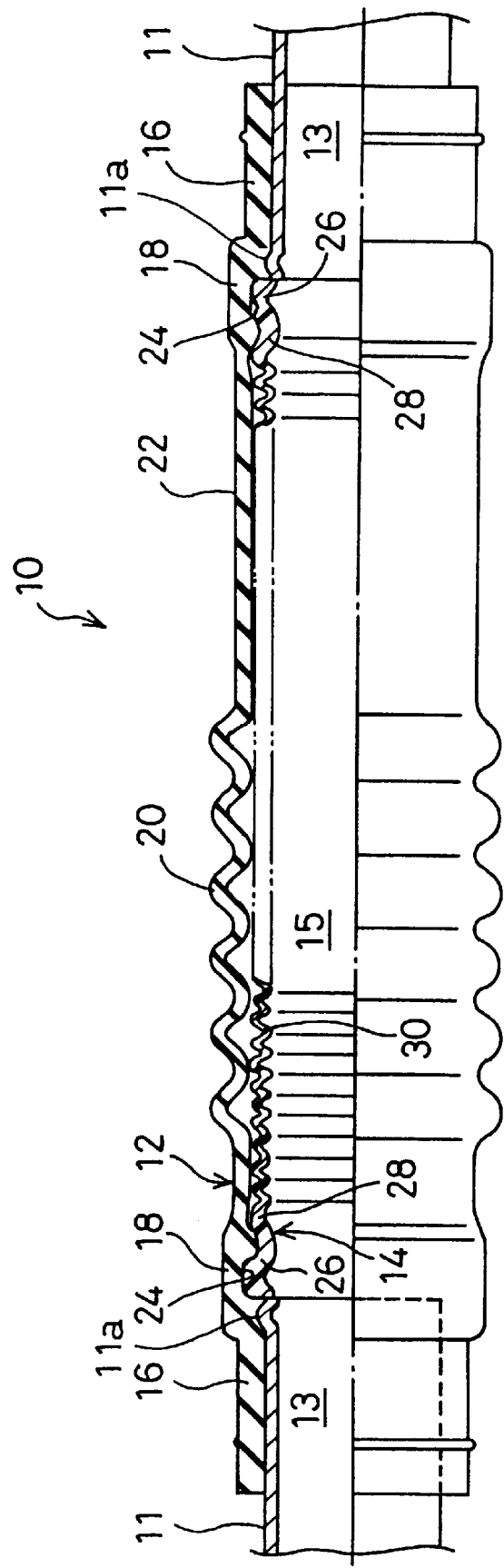
FIG. 1 is a side elevational view illustrating a hose, partly in section, of a first embodiment of the present invention.

Referring to the first embodiment in FIG. 1, the hose 10 includes an outer hose member 12 to which external members 11 are connected. An inner hose member 14 is arranged inside the outer hose member 12 to be substantially concentric with the outer hose member 12 along the length thereof. The outer hose member 12 is made of a rubber, and includes fitting tube elements 16 formed on both ends thereof, second tube elements 18 that extend axially away from the fitting tube elements 16 and have thicker walls in the diametral direction. Outer hose 12 also includes a bellows portion 20 and a straight tube portion 22 formed between the thick-walled tube elements 18 as shown in FIG. 1.

Where hose 10 is used for gasoline or fuel flow, the bellows portion 20 has an outer diameter of approximately 40 to 80 mm at the rise of the bellows and an inner diameter of approximately 30 to 70 mm at the fall of the bellows. The pitch of the rise and fall of the bellows portion 20 is approximately 10 to 20 mm. The inner diameter of the straight tube element 22 is approximately 30 to 70 mm, which is similar to the inner diameter at the bottom of the bellows portion 20. Both the bellows portion 20 and the straight portion 22 have a wall thickness of approximately 3 to 5 mm.

The fitting tube elements 16 have a wall thickness of approximately 4 to 5 mm in order to apply a sufficient clamping force against and to securely seal about the external members 11. The inner diameter of the fitting tube element 16 is naturally a little smaller than the outer diameter of the external member 11. The thick-walled second tube element 18 rises outwardly from the fitting tube element 16. An inner circumferential groove 24 is formed as a ring-shaped concavity in an inner circumferential face of each thick-walled tube element 18.

Figure 2:
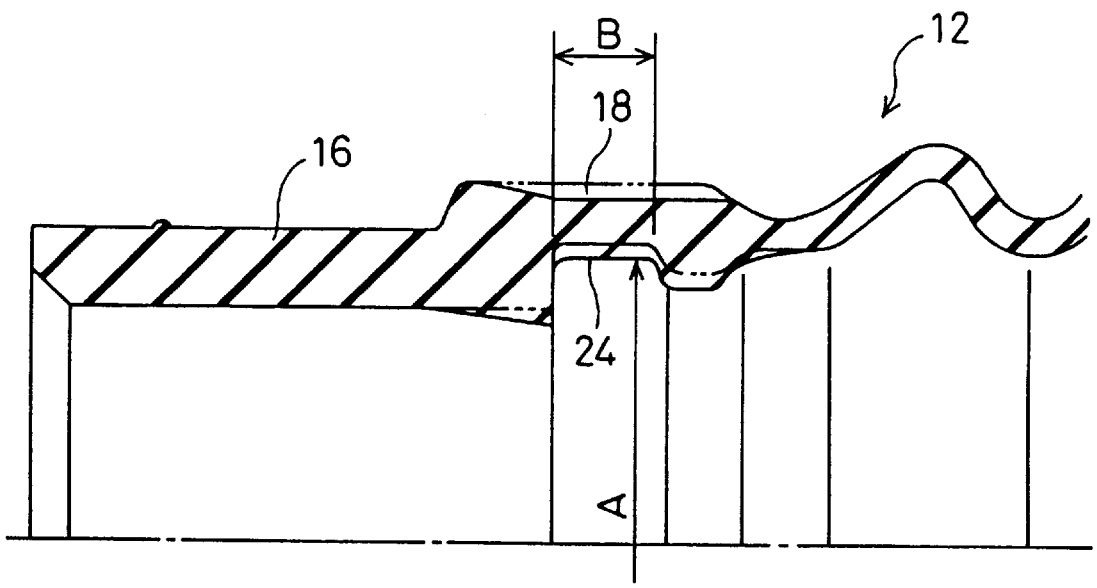
FIG. 2 is an enlarged sectional view illustrating an end portion of the outer hose in FIG. 1.

Referring to FIG. 2, the thick-walled tube element 18, with the inner circumferential groove 24, is deflected inwardly in the direction of its diameter, before a fitting projection ring element 26 is fitted into the inner circumferential groove 24, which is discussed later. An end portion of the fitting tube element 16, close to the inner circumferential groove 24, follows the deflection of the thick-walled tube element 18 and sags inwardly. Such inward positions are shown by comparing the full and dot-dash lines in FIG. 2. The thick-walled tube element 18 has a predetermined wall thickness in order to apply and maintain a restoring force in a diametral direction along the length of the hose 10 when the concavity of the inner circumferential groove 24 is deformed and dilated as shown by the two-dot chain line in the drawing of FIG. 2. For example, the thick-walled tube element 18 has a wall thickness of approximately 4 to 6 mm, which is substantially equal to the wall thickness of the fitting tube element 16 in this embodiment.

When each external member 11 is fitted into one end of the hose 10, the inner wall of the fitting tube element 16, on the side closest to the inner circumferential groove 24, is deformed diametrically outwardly by a curved projection element 11a formed on an end portion of the external member 11. This further improves the sealing properties of the end portion of the external member 11.

The inner circumferential groove 24 has a concave shape complimenting the outline of the fitting projection ring element 26 of the inner hose member 14. In order to press and clamp the inner hose projection ring element 26 securely in the direction of the diameter of hose 10, the inner circumferential groove 24 has an inner diameter A, which is originally set to be a little smaller than the outer diameter of the projection ring element 26 while being free from the insertion of the projection ring element 26. By way of example, when the outer diameter of the fitting projection ring element 26 is equal to 42 mm, the inner diameter A of the inner circumferential groove 24 should be set to approximately 37 mm. An effective groove width B (that is, distance between corners of the groove) of the inner circumferential groove 24 can be determined appropriately, but is preferably set to be about 5 through about 10 mm. The effective groove width B within this range enables the inner circumferential groove 24 to press and clamp the exterior of inner hose projection ring element 26 when fitted into the inner circumferential groove 24, as discussed later.

Since hose 10 of this embodiment is used to establish a gasoline or fuel flow path, the outer hose member 12 should be composed of a material having high flame resistance, wear and abrasion resistance, as well as oil resistance. The material adopted in this embodiment is a rubber mixture of butadiene-acrylonitrile copolymer (NBR) and polyvinyl chloride (PVC). The outer hose member 12, having the shape and the dimensions specified above, is prepared by vulcanizing the rubber mixture at a temperature ranging from 170° C. to 190° (C. and molding the vulcanized rubber mixture.

The inner hose member 14, arranged inside the outer hose member 12, is composed of a resin. As shown in FIG. 1, the inner hose member 14 is placed at a specific position within the outer hose member 12 to define an inner-hose flow path 15 that connects with flow paths 13 defined by the external members 11. Namely, while the inner hose member 14 is positioned in the outer hose member 12, the external members 11 come into contact with the inner hose member 14 to connect the flow paths 13 to the inner-hose flow path 15.

Figure 3:
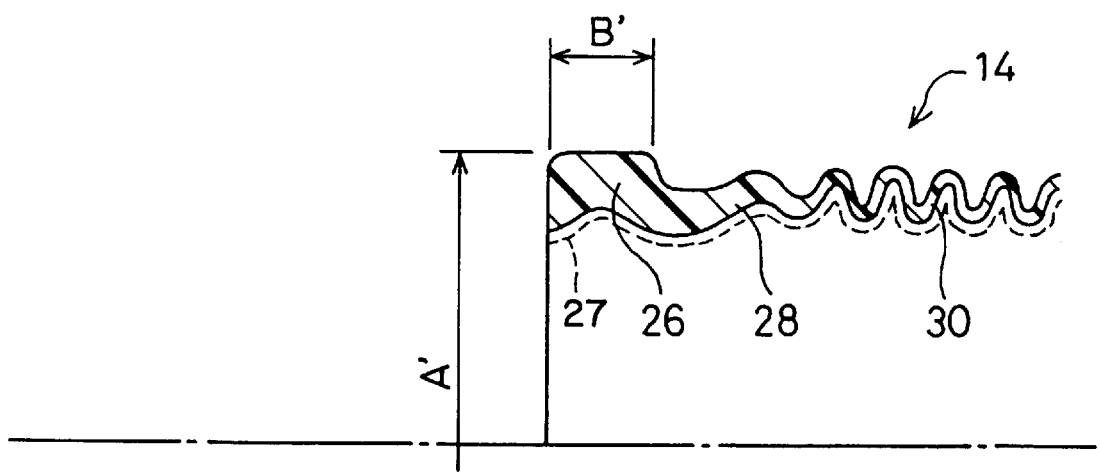
FIG. 3 is an enlarged sectional view illustrating an end portion of the inner hose in FIG. 1.

As shown in FIG. 1 and the enlarged sectional view of FIG. 3, the inner hose member 14 has a pair of fitting projection ring elements 26 that project from both ends thereof, a pair of intermediate elements 28 extending away from the fitting projection ring elements 26 and having a gradually decreasing wall thickness, and a bellows portion 30 formed between the pair of intermediate elements 28.

The outer diameter of the bellows portion 30 of the inner hose member 14 at the rise is set substantially equal to the inner diameter of the bellows portion 20 of the outer hose member 12, while the fall of the bellows portion 30 is substantially equal to the inner diameter of the straight tube element 22 of the outer hose member 12, so that the inner hose member 14 can be easily disposed inside the outer hose member 12. The pitch of the rise and fall of the bellows portion 30 of the inner hose member 14 is a little narrower than the same of the bellows portion 20 of the outer hose member 12, and set to be approximately 1 to 5 mm. The bellows portion 30 has a wall thickness of approximately 0.2 to 1.0 mm.

Each projection ring element 26 has a large wall thickness, in the direction of its diameter to possess a sufficient resistance against pressing forces applied by the thick-walled tube element 18. When the projection ring element 26 is mounted into the concavity of the inner circumferential groove 24 of the thick-walled tube element 18 the larger size of the projection ring element 26 dilates and deforms the concavity. In this embodiment, the projection ring elements 26 have a wall thickness of approximately 2.5 mm in the diametral direction. By taking into account the material of the inner hose member 14, the thickness of the projection ring elements 26 is appropriately designed to have a sufficient resistance against the pressing force. The forces being applied against projection ring elements 26 are shown by the arrows in FIG. 6. As this FIG. 6 demonstrates, the holding, sealing and restraining forces, are directed radially inwardly about the upper surface of projection ring elements 26. Some forces extend radially inwardly directly while others are at various angles depending upon the surface interaction between groove 24 and ring elements 26.

Figure 6:
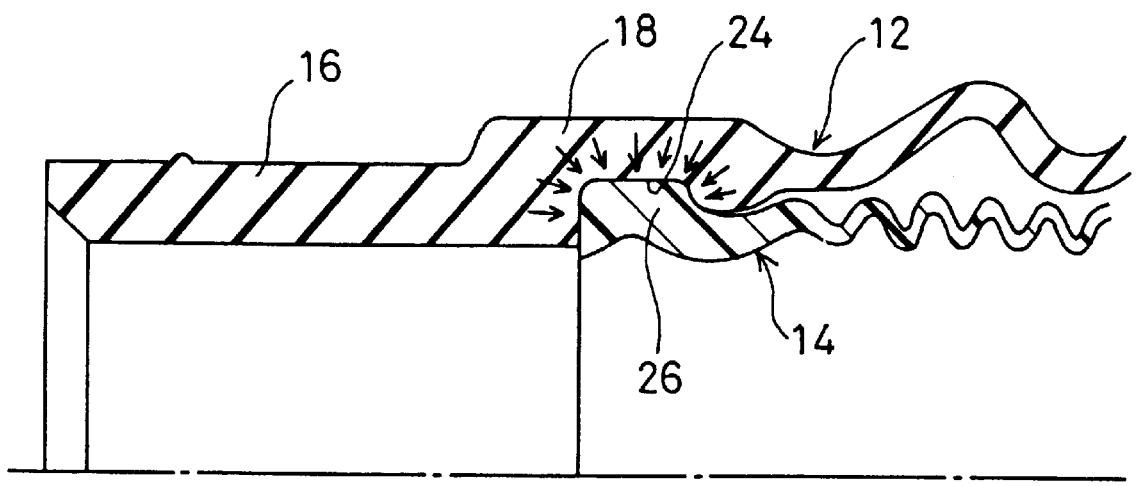
FIG. 6 is an enlarged sectional view showing the inter-fitting outer and inner hoses.
Figure 10:
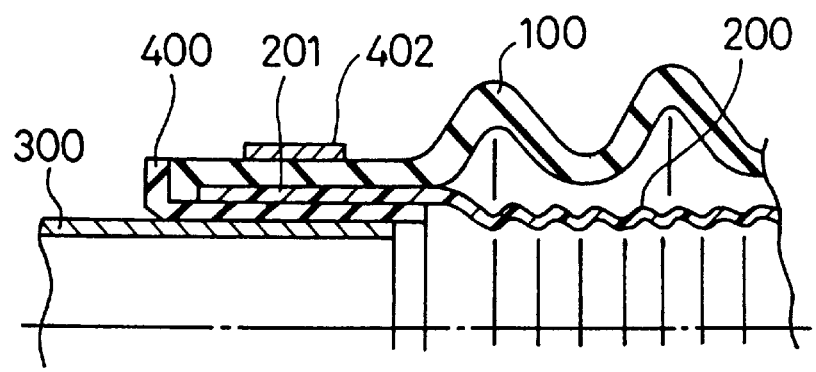
FIG. 10 illustrates a known structure for a prior art hose.

The projection ring element 26 has an outer surface with a convex shape corresponding to the concave shape of the inner circumferential groove 24. The projection ring element 26 has an outer diameter A', which is approximately 5 mm larger than the inner diameter A (for example, 37 mm) of the inner circumferential groove 24. An effective width B' (that is, distance between corners of the convex) of the projection ring element 26 is approximately 0.5 mm longer than the effective groove width B of the inner circumferential groove 24. The outer diameter A' and the effective width B' of the projection ring element 26 are determined corresponding to the size of the inner circumferential groove 24. Where the inner diameter A and the effective groove width B of the inner circumferential groove 24 are changed, with a variation in inner diameter of the straight tube element 22, the outer diameter A' and the effective width B' of the fitting projection ring element 26 are also varied to correspond to any such change. In addition, as shown in FIG. 6, the outer end wall 32, shown in FIG. 3, has a portion 34 that extends radially beyond the corresponding wall 36 of outer tube 16. Thus, as in FIG. 1, when external member 11, such as a pipe, is inserted into fitting tube element 16, the radially extending portion 34 of wall 32 extends over the end wall of external member 11 and provides a smooth transition between the interior surface of inner tube 14 and the interior surface of external member 1.

Since hose 10 of the first embodiment is used for gasoline or fuel lines, the inner hose member 14 is preferably composed of nylon 11, that is one of polyamide resins, and has sufficient flexibility and barrier properties against gasoline fuel. The inner hose member 14 having the shape and dimensions specified above is prepared, for example, by extrusion blow molding. Fluidized nylon 11 is extruded from an extruder die to form a parison and the parison is then blow molded in a molding die. The projection ring element 26 is formed to have the greater wall thickness by controlling the parison in the process of extrusion from the extruder die, and is blow molded to the convex shape with the above-specified dimensions in the blow molding die.

In accordance with another preferable application, the inner hose member 14 may be prepared by multi-layer blow molding; a fluororesin is used as an inner layer 27 and another resin as an outer layer. A preferable example of another resin is polyamide resin. In this configuration, the inner layer of fluororesin 27 improves the barrier properties against alcohols, whereas the outer layer of polyamide resin assures a sufficient resistance against the desired pressing forces.

Figure 4:
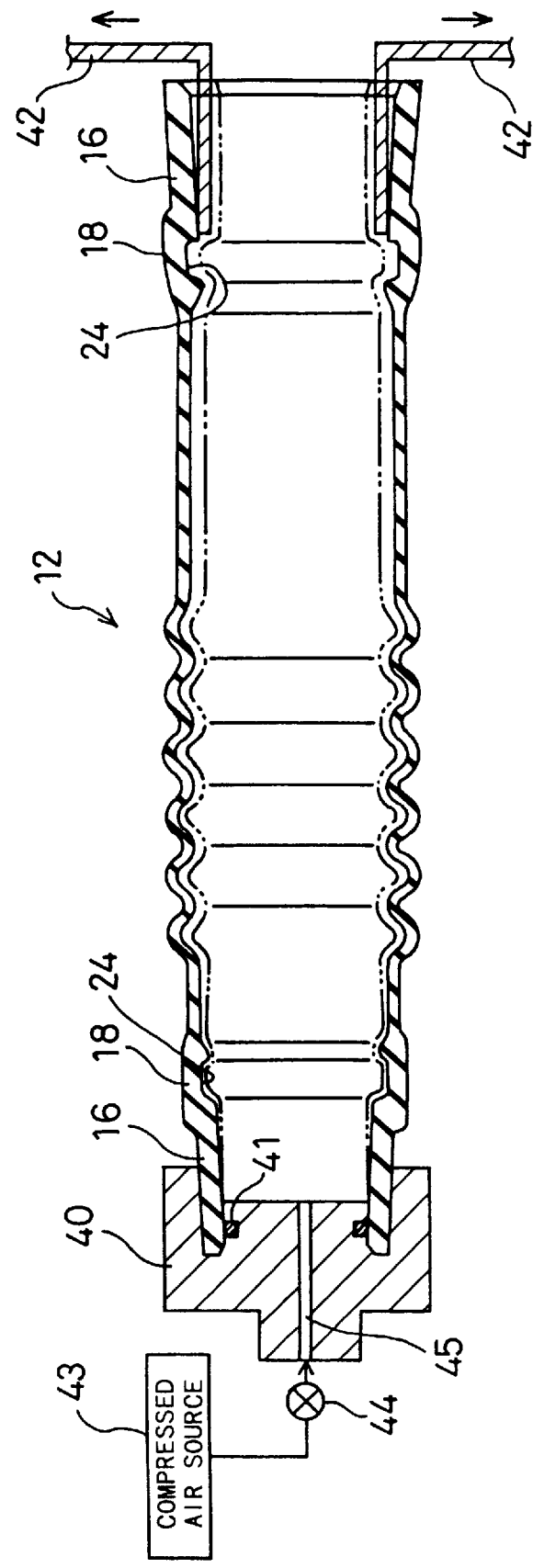
FIG. 4 shows a step during manufacturing the hose in FIG. 1.

The following describes a process of manufacturing the hose 10 thus constructed. Referring to FIG. 4, one of the fitting tube elements 16 of the outer hose member 12 is placed into an air blow jig 40. With the outer hose member 12 attached to the air blow jig 40, and the fitting tube element 16 being hermetically sealed to the air blow jig 40 by an O-ring 41 one end is ready. A dilatation jig 42 is, on the other hand, inserted into the opposite fitting tube element 16 to dilate that opposite end as shown by the arrows in the direction of its diameter. Compressed air, supplied from a compressed air source 43, such as a compressor, is blown into the outer hose member 12 via a valve 44 and an air blow hole 45 in jig 40. Compressed air is continuously blown in until valve 44 is closed.

In parallel to the dilatation of the opposite fitting tube element 16 by dilatation jig 42 and the blowing of compressed air through the air blow jig 40, a specific procedure is then carried out to arrange the inner hose member 14 inside the outer hose member 12.

Figure 5:
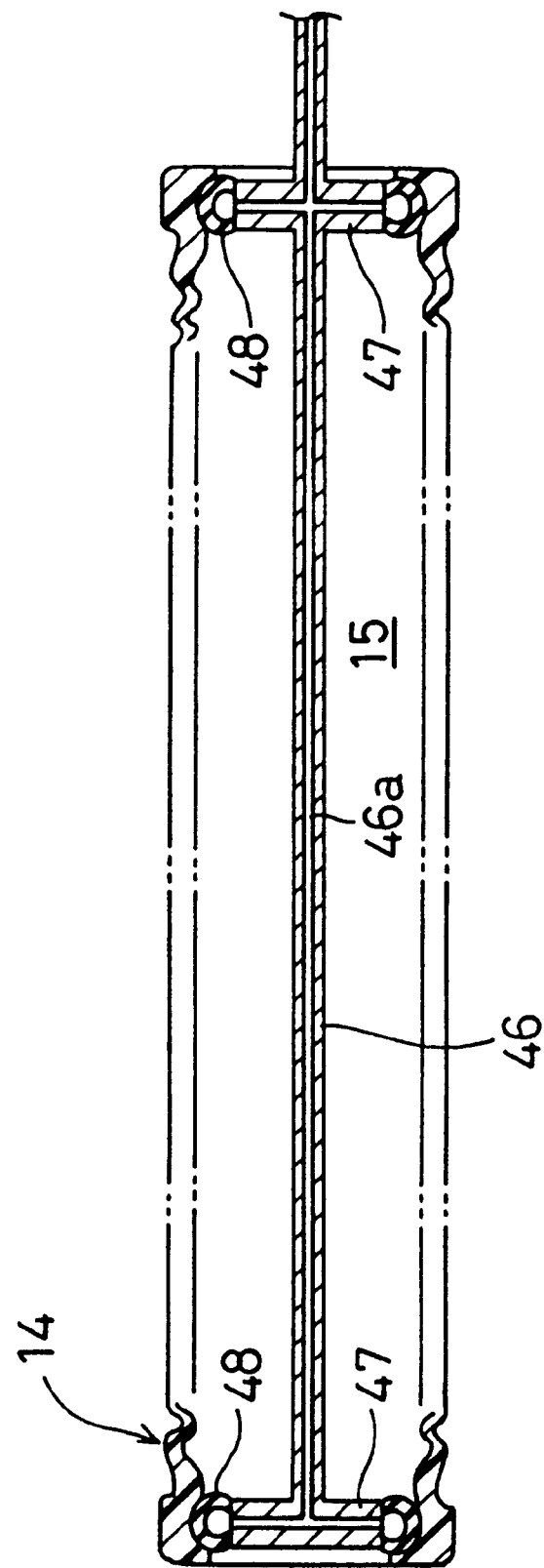
FIG. 5 shows another step during such manufacturing.

Referring to FIG. 5, a hose support shaft 46 is set in the inner-hose flow path 15, defined by the inner hose member 14, in order to support the inner hose member 14. Then, the inner-hose flow path 15 is hermetically sealed, relative to the outside, by air bladders 48 formed around each of a pair of flanges 47 that are spaced apart along the hose support shaft 46. Air is forced through an air conduit 46a, formed in the hose support shaft 46, to distend the air bladders 48, so as to support the inner hose member 14 and maintain the air tightness of the inner-hose flow path 15.

The inner hose member 14, supported in the above manner, is thereafter shifted to the opening of the fitting tube element 16 of the outer hose member 12 that has already been dilated by the dilatation jig 42, and is subsequently inserted through the dilated fitting tube element 16 into the outer hose member 12. Insertion of the inner hose member 14 having the air-tight inner-hose flow path 15 enables the opening of the fitting tube element 16 to be closed by one end portion of the inner hose member 14. The inner hose member 14 thereby interferes with the air blowing through the inner hose 12 and out of the dilated opening of the fitting tube element 16. The pressure of the compressed air supplied by the air blow jig 40 diametrically expands the outer hose member 12 along its length from its original shape shown by the two-dot chain line in FIG. 4. While the outer hose member 12 is being expanded, the inner hose member 14, supported by the hose support shaft 46, is inserted into the outer hose member 12 until the projection ring elements 26 of the inner hose member 14 are positioned to face and are positioned into a corresponding inner circumferential groove 24 at opposite ends of the outer hose member 12.

After the inner hose member 14 is positioned inside the outer hose member 12, valve 44 is shut to stop the flow of compressed air. Also, dilatation jig 42 returns to an undilated position and is taken out of that fitting tube element 16. This cancels the expansion of the outer hose member 12 and the dilatation of the fitting tube element 16. After the projection ring elements 26 are received by their corresponding inner circumferential grooves 24, respectively, the expanded inner circumferential grooves 24 are likewise restored to their original shape. This enables each of the projection ring elements 26 of the inner hose member 14 to be securely retained in the concavity of the inner circumferential grooves 24 of the outer hose member 12 while also, due to the size differences, still dilating and deforming that concavity. In accordance with another possible application, a jig (not shown) may be used to draw the outer hose member 12 against projection rings 26 after the flow of compressed air has stopped in order to assure the proper relationship between the projection ring elements 26 and the inner circumferential grooves 24.

The outer hose member 12 with the inner hose member 14 arranged therein is then separated from the air blow jig 40, so that the completed hose 10 has the inner hose member 14 substantially concentrically arranged inside the outer hose member 12 along its length (see FIG. 1). The completed hose 10, accordingly, has a double-layer structure. That is, the resin inner hose member 14 is arranged inside the rubber outer hose member 12. The external members 11 are then inserted into the fitting tube elements 16, formed on either ends of the outer hose member 12 of the hose 10, and fixed by clamps (not shown). Hose 10 is thus connected to the external members 11 so that the flow paths 13, defined by the external members 11, connect with the inner-hose flow path 15 defined by the inner hose member 14. Fuel, such as gasoline, will smoothly flow through hose 10 relative to the external members 11. Simultaneously with, or otherwise immediately before or after, the separation of the outer hose member 12 from the air blow jig 40, the hose support shaft 46 is pulled out of the inner hose member 14. Stopping the flow of air to air bladders 48 also return them to their contracted state. This allows shaft 46 to be withdrawn from within inner hose 14.

In hose 10 according to the first embodiment discussed above, the projection ring elements 26 are retained in the inner circumferential grooves 24 formed in the thick-walled tube elements 18 of the outer hose member 12 with the inner circumferential grooves 24 in an extended state. Placement of projection ring elements 26 into the inner circumferential grooves 24 also defines the arrangement of the inner hose member 14 with respect to the outer hose member 12 and fixes the inner hose member 14 within the outer hose member 12.

By having the projection ring elements 26 of the inner hose member 14 extend the inner circumferential grooves 24 of the outer hose member 12, that deformation of the rubber material causes the thick-walled tube elements 18 to produce forces that are applied along the concavity of the inner circumferential grooves 24 as shown by the arrows in the drawing of FIG. 6. Such forces act as a pressing force against the projection ring elements 26 to both hold and tightly seal about the projection rings 22. The thick wall of the thick-walled tube elements 18 enables such pressing forces to be maintained while the projection ring elements 26 are retained within the inner circumferential grooves 24 formed in those thick-walled tube elements 18. In hose 10 according to the first embodiment, such pressing forces enable the inner hose member 14 to be securely fixed to the outer hose member 12 with high sealing properties through the projection ring elements 26 within the inner circumferential grooves 24. The structure of the embodiment also allows each external member 11 to be directly attached to the fitting tube element 16 of the outer hose member 12. Unlike the conventional hose structure, the hose structure 10 of the embodiment does not require interposition of any additional or separate element or turn-up of the end portion of the outer hose member. The hose structure 10 of this first embodiment thus favorably simplifies the process of clamping and fixing the hose 10 to the external members 11.

The method discussed previously to manufacture hose 10 according to the first embodiment expands the outer hose member 12, in the direction of its diameter along its length, before the inner hose member 14 is placed inside the outer hose member 12. This enables the inner hose member 14 to be readily inserted into the outer hose member 12. The subsequent cancellation of the expansion of the outer hose member 12 enables the projection ring elements 26 of the inner hose member 14 to be securely received in the concavity of the inner circumferential grooves 24 while projection ring elements 26 continue to dilate and deform the concavity. Consequently, hose 10 by a simple procedure is constructed from an inner hose member 14 that is securely fixed to an outer hose member 12 with high sealing properties therebetween, with the resulting hose being easily clamped and fixed to external members 11.

The hose 10 of the first embodiment has the following advantages other than those specified above.

(1) Hose 10 includes a bellows portion 20 of the outer hose member 12 and a bellows portion 30 of an inner hose member 14, which overlap each other along the length of the bellows portion 20. This structure enables hose 10 to be curved gently or otherwise expanded or contracted, to some extent, along the length of the bellows portion 20. This increases the degree of freedom of the hose in connecting together the two external members 11 and extends the applicable range of the hose 10. The outer bellows portion 20 and the inner bellows portion 30 effectively absorb the expansion and contraction of the hose 10 occurring in use.

(2) In the hose 10, only the rises of the bellows portion 30 of the inner hose member 14 come into contact with the outer hose member 12. This structure lowers the frictional resistance and enables the inner hose member 14 to be independently curved or otherwise expanded or contracted without any difficulties. This leads to improved flexibility of the hose 10 as well as in workability, for example, bending of the hose 10.

(3) The hose 10 includes an air space defined between the outer bellows portion 20 and the inner bellows portion 30. This air space provides a heat shielding effect which enhances the heat resistance and fire resistance of the hose against gasoline or fuel flowing through the inner-hose flow path 15.

(4) The hose 10 has the double-layer structure including the outer hose member 12 and the inner hose member 14. The outer hose member 12 is composed of a rubber having the high fire resistance, for example, a rubber mixture of butadiene-acrylonitrile copolymer (NBR) and polyvinyl chloride (PVC), whereas the inner hose member 14 is made of a polyamide resin, for example, (nylon 11) having high barrier properties. These materials, in combination with the heat shielding effect of the air space, further enhance the heat resistance and fire resistance against gasoline or other fuel. The barrier properties of the inner hose member 14 also effectively prevent gasoline or other fuel and vapors from leaking out of the inner-hose flow path 15.

(5) In the hose 10 of the first embodiment, the inner hose member 14 can have the bellows portion 30 formed along the whole length of the inner hose member 14 except at the projection ring elements 26 and the intermediate elements 28. When the inner hose member 14 is inserted into the outer hose member 12 from either end, the bellows portion 30 of the inner hose member 14 and the bellows portion 20 of the outer hose member 12 concentrically overlap. The inner circumferential grooves 24 formed on both ends of the outer hose member 12, as well as the projection ring elements 26 formed on both ends of the inner hose member 14, have substantially the identical shape and dimensions. When the inner hose member 14 is inserted into the outer hose member 12 from either end, the projection ring elements 26 can be received by the inner circumferential grooves 24. This structure does not specify the direction of insertion of the inner hose member 14 into the outer hose member 12, and the procedure of assembly is thus favorably simplified.

Another hose 10A described below as a second embodiment according to the present invention has a significantly curved hose conduit. In the hose 10A of the second embodiment, like elements that have the same functions as those in the first embodiment are shown by like numerals with the symbol 'A' and are not further described here.

Figure 7:
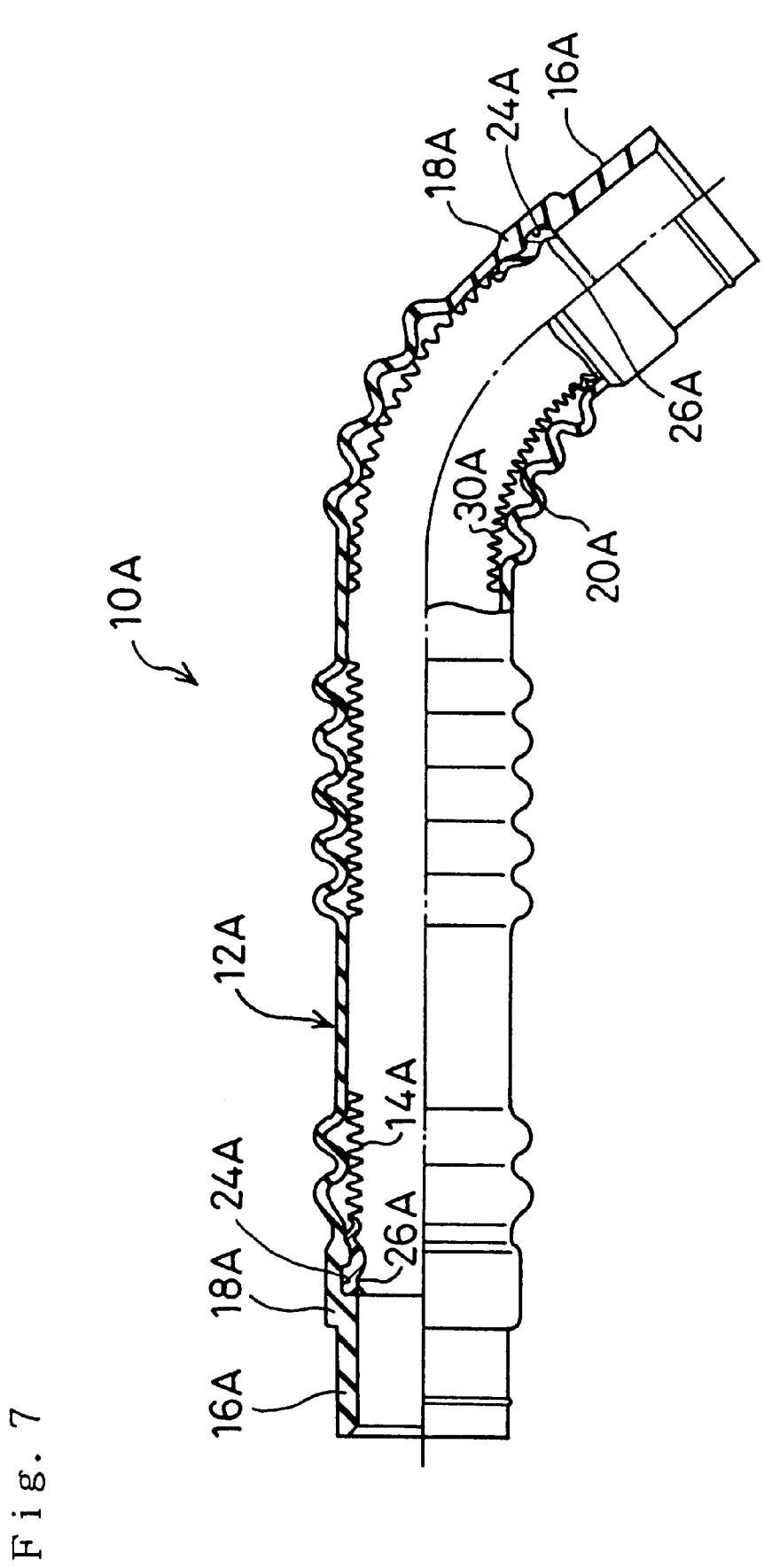
FIG. 7 is a side elevational view illustrating a hose, partly in section, for a second embodiment of the present invention.

Referring first to FIG. 7, hose 10A of the second embodiment also has a double-layer structure; an inner hose member 14A that is substantially concentrically arranged inside an outer hose member 12A along its length. The outer hose member 12A has a curved portion as shown in FIG. 7. A bellows portion 20A of the outer hose member 12A is contracted in a range corresponding to inside of the curved portion, while being expanded in a range corresponding to outside of the curved portion. In the hose 10A of the second embodiment, projection ring elements 26A are fitted and secured into the concavity of inner circumferential grooves 24A that continue to be formed in thick-walled tube elements 18A which are dilated and expanded along the concavity. The pressing force applied by the thick-walled tube elements 18A enables the inner hose member 14A to be securely fixed to the outer hose member 12A with high sealing properties. Like the first embodiment, the outer hose member 12A of the hose 10A can be clamped directly to external members. This favorably simplifies the procedure of clamping and fixing the hose 10A to the external members.

The hose 10A of the second embodiment is manufactured in the following manner. The outer hose member 12A is prepared by vulcanizing a rubber mixture of butadiene-acrylonitrile copolymer (NBR) and polyvinyl chloride (PVC), at the temperature of 170° C. to 190° C. and then molding the vulcanized rubber mixture. The outer hose member 12A is molded to have the curved bellows portion 20A as shown in FIG. 8(a). While the curved outer hose member 12A is stretched and kept straight, as in FIG. 8(b), by some means (not shown), the air blowing jig 40 and the dilatation jig 42, mentioned previously in the first embodiment, are attached to opposite ends of the outer hose member 12A to blow the compressed air into one end of the outer hose member 12A and dilate a fitting tube element 16A at the opposite end (see FIG. 4 in the first embodiment). Alternatively, the outer hose member 12A may be stretched or straightened after the air blow jig is attached to the outer hose member 12A.

Figure 9A:
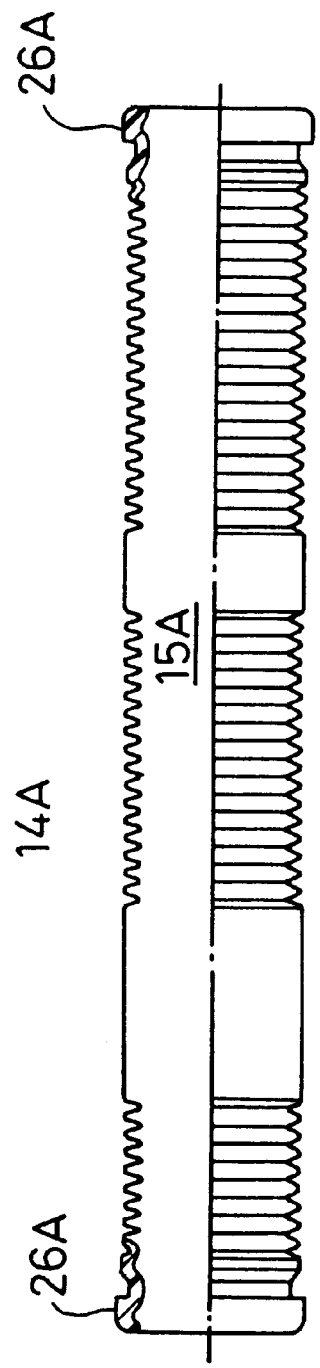
FIGS. 9(a) and 9(b) show the process of manufacturing an inner hose member.
Figure 9B:
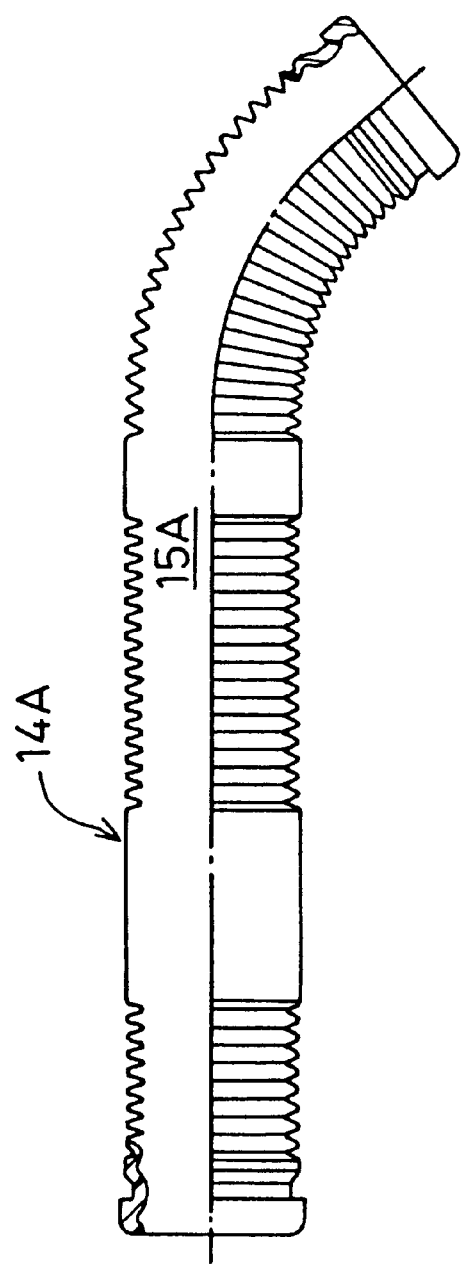

The inner hose member 14A is prepared in the following manner. A straight blow-molded object, shown in FIG. 9(a), is obtained by extrusion blow molding, that is, by extruding fluidized nylon 11 from an extruder die into a parison and then by blowing the parison in a molding die. The straight blow-molded object is then placed in a mandrel having an inner tube portion curved to a specified shape, it is thermally treated at 100(C. for five minutes, and subsequently cooled. This procedure gives the inner hose member 14A, as shown in FIG. 9(b), a curved shape similar to the outer hose member 12A (see FIG. 8(a)). The inner tube portion of the mandrel has a diameter corresponding to the required diameter of the inner hose member 14A. The curved inner hose member 14A is forcibly stretched, and the hose support shaft 46 is then inserted into an inner-hose flow path 15A of the inner hose member 14A so as to keep the inner hose member 14A straight (see FIG. 5).

The same steps as those in the process of manufacturing the hose 10 of the first embodiment are then carried out. These steps include insertion of the inner hose member 14A into the outer hose member 12A, cessation of the blowing of compressed air, restoration and removal of the dilatation jig 42, separation of the outer hose from the air blowing jig 40, and removal of the hose support shaft 46. After the hose support shaft 46 is taken out of the inner hose member 14A and the means for keeping the outer hose member 12A straight is removed, the outer hose member 12A and the inner hose member 14A are restored to the their original curved shapes, so that the curved hose 10A shown in FIG. 7 is completed.

Like hose 10 of the first embodiment, hose 10A of the second embodiment, having the significantly curved hose conduit, can be readily manufactured by molding the curved outer hose member 12A and the curved inner hose member 14A and by keeping both the hose members 12A and 14A straight during the assembly.

The present invention is not restricted to the above embodiments since but there may be many modifications, changes, and alterations without departing from the scope or spirit of the main characteristics of the present invention.

By way of example, hose 10A, having the significantly curved hose conduit, may be manufactured in the following manner. The hose 10 including the straight outer hose member 12 and the straight inner hose member 14 to define the straight hose conduit is manufactured first according to the process specified in the first embodiment. Heat treatment suitable for the material of the hose 10 is then carried out to thermally deform the hose 10 to the shape of hose 10A having the significantly curved form. This procedure enables the hose having the double-layer structure of a relatively sharp curvature, such as 60 degrees or 90 degrees, to be readily manufactured. The resulting hose has the inner hose member securely fixed to the outer hose member and with high sealing properties therebetween.

It should be clearly understood that the above embodiments are only illustrative and not restrictive in any sense. The scope and spirit of the present invention are limited only by the terms of the appended claims.

What is claimed is:

1. A hose arranged to be connected with an external member that provides a flow path for a fluid connected with the flow path of the external member, said hose comprising:
    an outer hose member composed of rubber and having a first tube element formed on an end thereof so that the external member can be connected to said first tube element; and
    an inner hose member composed of resin and arranged inside said outer hose member to define said inner hose flow path,
    said outer hose member further comprising:
    a second tube element located circumferentially about at least a portion of said inner hose member, said second tube element having a wall thickness that applies and maintains a restoring force when said second tube element is dilated in a diameter direction along the length of said second tube element, said second tube element having an inner circumferential groove formed in an inner circumferential face thereof,
    said inner hose member comprising:
    a projection ring element shaped to fit into said inner circumferential groove and extend said inner circumferential groove to thereby seal said outer and inner hose members.

2. A hose in accordance with claim 1, wherein said outer hose member is composed of a rubber material selected among the group consisting of a butadiene rubber, a rubber mixture of butadiene-acrylonitrile copolymer and polyvinyl chloride, an ether rubber, and a fluororubber.

3. A hose in accordance with claim 1, wherein said inner hose member is composed of either a polyamide resin or a fluororesin.

4. A hose in accordance with claim 1, wherein said inner hose member has a double-layer structure comprising an inner layer composed of a fluororesin and an outer layer composed of a polyamide resin.

5. A hose in accordance with claim 1, wherein said outer hose member further comprises a first bellows tube element, and said inner hose member comprises a second bellows tube element that is in contact with an inner-most diametral portion of said first bellows tube element.

6. A hose in accordance with claim 1, wherein said outer hose member comprises a pair of said first tube elements formed on both ends thereof and a pair of said second tube elements that have an identical shape and respectively extend from said first tube elements, and wherein
    said inner hose member comprises a pair of said projection ring elements that have an identical shape and are arranged at a pitch corresponding to a pitch of a pair of said inner circumferential grooves formed in said pair of said second tube elements.

7. A hose arranged to be connected with an external member that provides a flow path for a fluid connected with the flow path of the external member, said hose comprising:
    an outer hose member composed of rubber and having a first tube element formed on an end thereof so that the external member can be connected to said first tube element; and
    an inner hose member composed of resin and arranged inside said outer hose member to define said inner hose flow path,
    said outer hose member further comprising:
    a second tube element located circumferentially about at least a portion of said inner hose member, said second tube element having a wall thickness that applies and maintains a restoring force when said second tube element is dilated in a diameter direction along the length of said second tube element, said second tube element having an inner circumferential groove formed in an inner circumferential face thereof,
    said inner hose member comprising:
    a projection ring element which fits into said inner circumferential groove, extends said inner circumferential groove and seals said outer and inner hose members, wherein said projection ring element has a diametral dimension that is 10 to 20 greater than that of said inner circumferential groove of said second tube element in a non-dilated state and a longitudinal dimension along the length of said hose that is 0.5 to 2 mm longer than that of said inner circumferential groove.

8. A hose arranged to be connected with an external member that provides a flow path for a fluid connected with the flow path of the external member, said hose comprising:
    an outer hose member composed of rubber and having a first tube element formed on an end thereof so that the external member can be connected to said first tube element; and
    an inner hose member composed of resin and arranged inside said outer hose member to define said inner hose flow path,
    said outer hose member further comprising:
    a second tube element located circumferentially about at least a portion of said inner hose member, said second tube element having a wall thickness that applies and maintains a restoring force when said second tube element is dilated in a diameter direction along the length of said second tube element, said second tube element having an inner circumferential groove formed in an inner circumferential face thereof,
    said inner hose member comprising:
    a projection ring element which fits into said inner circumferential groove, extends said inner circumferential groove and seals said outer and inner hose members, wherein said projection ring element is composed of a complex material that is obtained by mixing a reinforcing material with said resin.

9. A hose according to one of claim 7 or claim 8, wherein said outer hose member is composed of a rubber material selected among the group consisting of a butadiene rubber, a rubber mixture of butadiene-acrylonitrile copolymer and polyvinyl chloride, an ether rubber, and a fluororubber.

10. A hose according to one of claim 7 or claim 8, wherein said inner hose member is composed of either a polyamide resin or a fluororesin.

11. A hose according to one of claim 7 or claim 8, wherein said inner hose member has a double-layer structure comprising an inner layer composed of a fluororesin and an outer layer composed of a polyamide resin.

12. A hose according to one of claim 7 or claim 8, wherein said outer hose member further comprises a first bellows tube element, and said inner hose member comprises a second bellows tube element that is in contact with an inner-most diametral portion of said first bellows tube element.

13. A hose according to claim 7 or claim 8, wherein said outer hose member comprises a pair of said first tube elements formed on both ends thereof and a pair of said second tube elements that have an identical shape and respectively extend from said first tube elements, and wherein said inner hose member comprises a pair of said projection ring elements that have an identical shape and are arranged at a pitch corresponding to a pitch of a pair of said inner circumferential grooves formed in said pair of said second tube elements.

* * * * *